April 21, 1959     R. A. S. TEMPLETON     2,882,609
MANUFACTURE OF DRIED EDIBLE PRODUCTS
Filed May 3, 1957
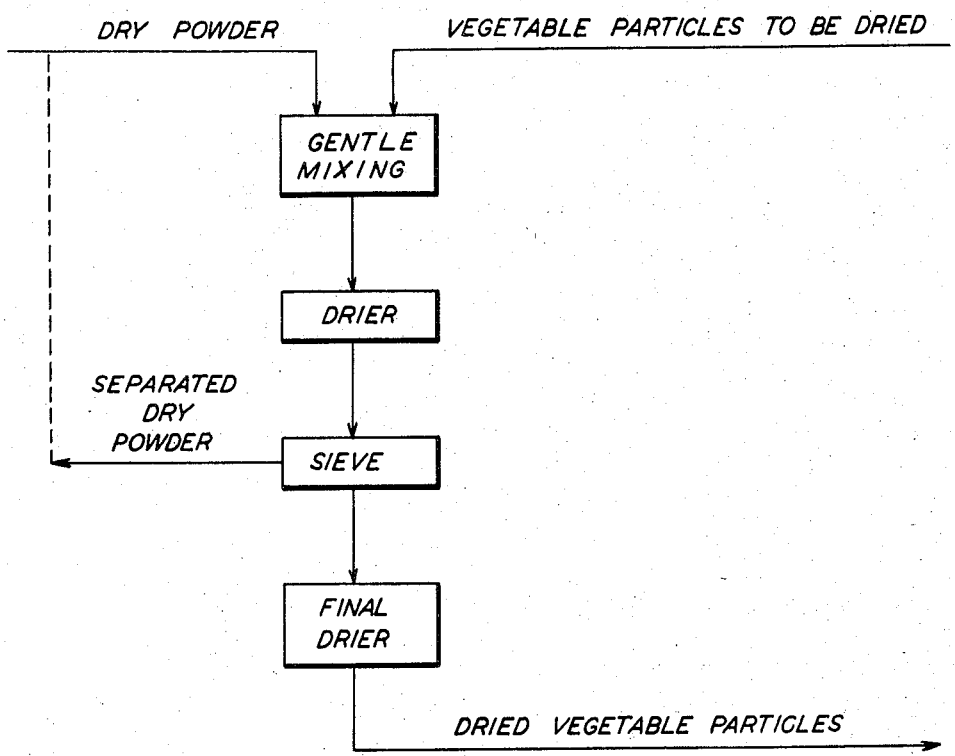
INVENTOR.
ROBERT A. S. TEMPLETON
BY
ATTORNEYS

2,882,609

MANUFACTURE OF DRIED EDIBLE PRODUCTS

Robert Alexander Spencer Templeton, London, England

Application May 3, 1957, Serial No. 656,761

Claims priority, application Great Britain May 7, 1956

11 Claims. (Cl. 34—9)

There is a known difficulty in the preparation of dehydrated foodstuffs in the form of dice or flakes of small size. It is obviously advantageous to be able to dehydrate vegetables and other foodstuffs in the form of dice or flakes of small size, because the ratio of surface area to volume is large and it may therefore be expected that there will be a quick reconstitution and recooking time as compared with relatively large dice or flakes which must have a relatively long reconstitution and recooking time. There is at the same time a preference by the consumer for having dried foodstuffs in the form of discrete pieces as compared with powder form, from which only a purée can be produced on reconstitution.

The difficulty commonly encountered in the production of small dice or flakes is that on cutting up a foodstuff into small pieces, due to the very large cut surface, so much juice is liberated that on commencing to dry the foodstuff, the pieces cohere together to form lumps, bound together by the juice, which becomes cemented as it dries.

It has now been discovered that if the surface moisture of the discrete particles can be removed, so as to produce surface-dried discrete particles, then the final drying of the particles can proceed without difficulty by any customary form of direct heating, such as drying by means of vacuum or a current of warm air, which can be passed through the mass of discrete particles, which are no longer mutually adhesive.

According to the present invention a method of preparing a dried food in the form of discrete pieces such as cubes or slices, comprises gently mixing the food substance in the form of discrete pieces with a dried, cellularly intact, powdered food substance, the quantities of the two substances being chosen so that the powder takes up the surface moisture of the pieces without losing its powdery characteristics, the pieces thereafter being dried by heating or evaporation, whilst mixed with, or after separation from, the powder. Thus, for example, when slices or dice of carrot are added to a base consisting of dried material which consists predominantly of water-absorptive carbohydrate material such as cooked mashed potato powder, the surface and near-surface juices of the carrot, which may be cooked or raw, are absorbed into the potato cells whilst the carrot pieces and potato powder are mixed together for a certain period of time.

The surface drying of the carrot pieces in this way reduces their tendency to adhere to each other with the result that one of the known difficulties of drying carrot slices or dice, especially when cut small, is overcome.

Another distinct advantage is that these carrot slices or dice, so treated before their final drying or in course of a drying operation, have a distinctly improved and more rapid reconstitution time and a more even reconstitution time when water is added thereto, because the initial surface-drying of the carrots by the powder is effected at a relatively low temperature by means of absorption, thus avoiding the formation of a hard surface film, or otherwise destroying the porosity required for reconstitution.

As an example of the process 100-lbs. of dried cooked potato powder is placed in a mixer fitted with a stirring device, and 50-lbs. of carrot slices or dice, cooked or uncooked, is added thereto and the whole gently agitated to distribute the dried potato powder over the surfaces of the slices or discs of the carrots and thereby to enable absorption of juice by the potato powder to take place without substantially breaking down or altering the characteristic shape of the carrot slices or dice.

A period of a few minutes mixing and/or conditioning is found adequate for this phase of the operation, though obviously the extent of the absorption will vary with the relative size of the slices or dice and with the temperature of the mixture, which may be hot or cold, but if it is hot then absorption is generally more rapid.

The mixture, after reaching the desired degree of equilibrium, may be subjected to any convenient form of final drying and the potato material may be sieved away from the carrot slices or dice before or after the final drying, according to convenience.

The final drying may conveniently be carried out in a pneumatic drier, wherein the product is carried in a high velocity current of hot air whilst being dried. It may be desirable to separate out the carrot slices or dice from the powdered food substance when they still have a moisture content of about 30% and finally dry them separately on trays or travelling band or in vacuum if the size of the slices or dice is, for example, too large to secure complete drying in the high velocity air stream.

One advantage of this method is that if the potato material is not sieved out but put through the pneumatic drier, the end product will be a relatively dry powder with a relatively less dry product of slices or dice and the dry powder may more easily be sieved away for return and re-use in the preparation of the next batch and so on.

If the potato powder is sieved away before the final drying, it is again convenient to use this, after such drying as may be necessary, as the base material for the next batch of carrot slices or dice added, with the mixing carried out as before, and then the potato powder may be used again for succeeding batches. The color and taste and flavor of the base potato material so used will gradually acquire the characteristics of the primary product, for example, carrot, under treatment.

It is possible to operate the present process using a dried base powder of the food substance to be dried. Thus, carrot powder can be used with slices or dice, when carrots are to be treated. But in such case, due it may be to the absence of the starch cells characteristic of the potato, the effectiveness of the absorption of the surface or near-surface liquors is less satisfactory, and in such case therefore the addition of smaller quantities of the primary product to be treated is recommended.

In such case, the addition of only 40-lbs. of carrot slices or dice to 100-lbs. of carrot powder is recommended.

Where reconstitutable dice or slices alone are required, it is advisable to subject the finally dried carrot slices or dice to a light brushing by any normal brush sieve, so as to take away any particles of the base material (whether potato powder or carrot powder) which may be adhering to the surfaces of the slices or dice, as these would produce a paste or thickening on reconstitution. This may not be objectionable where the carrot is to be used in a soup product, however.

Thus, this process is most useful for the production of a dry carrot product partly in powder form and partly in discrete recognisable carrot pieces—either slices or dice—for in this event no sieving is required, and a special advantage arises in that the flavor and other factors which have been absorbed in the base material during the initial drying will be wholly retained thereby and be available on reconstitution.

The invention from this aspect will have a very wide range in facilitating the production of distinct small or relatively large pieces of vegetables, fruit, fish or meat, which are required to be dried in such a way as to retain the ability to reconstitute with water rapidly, and to retain after reconstitution the maximum flavor and appearance, especially the shape and type of the original pieces.

It is well established that the ability of all such dried products to reconstitute with water is inversely proportional to the size of the slices or dice, or in the case of fish, flakes or pieces. It is well-known how to cut such products into relatively fine particles, but heretofore it has been practically impossible to dry such products when finely divided, especially if they have been cooked, because of their tendency to mat closely together against any passage of air or other drying medium, due to the presence of the surface or near-surface liquors. The present process removes these liquors without sealing up the surface of the pieces, and consequently transforms such products, however finely divided, into an entirely different physical condition which is ideal for drying by any one of the several types of direct drying operations which are well-known to all persons skilled in the art.

The accompanying flow sheet diagrammatically illustrates the several steps in the carrying out of the process as described above.

I claim:

1. A process of preparing a dried vegetable food substance in the form of discrete pieces which comprises mixing discrete particles of the food substance having cut surfaces and having on such surfaces the natural liquids of the food substance which tend to cause said particles to adhere to one another with an amount of a different vegetable substancee in dry powdered form sufficient to take up such surface liquid to distribute said dry powdered substance over said surface of said discrete particles, said different dry substance being predominantly a water-absorptive carbohydrate material, and thereafter drying the discrete particles under conditions which preserve their identity as discrete particles.

2. The process claimed in claim 1 wherein the dry powdered substance is cooked mashed potato powder.

3. The process claimed in claim 1 wherein the discrete particles are separated from the dry powdered substance after their moisture content has been reduced to about 30%, and the discrete particles are thereafter dried separately from the dry powdered substance.

4. The process claimed in claim 3 wherein the separated powdered substance is dried and employed as the dry powdered substance for a subsequent batch of discrete particles to be dried.

5. The process claimed in claim 1 wherein the discrete particles and dry powdered substance are dried together until the dry powdered substance is reduced to substantially its initial moisture content, and the discrete particles are then separated from the dry powdered substance and dried separately to the final desired moisture content.

6. The process claimed in claim 1 in which the amount of dry powdered food substance mixed with the discrete particles of food substance is such that after taking up the liquid on the discrete particles it still retains its powdery characteristics.

7. The process claimed in claim 1 in which the amount of the dry powdered food substance is at least about twice that of the discrete particles, by weight.

8. The process claimed in claim 1 in which the discrete particles are dried in a stream of warm air until their moisture content has been reduced to about 30% and the discrete particles thereafter are dried on a travelling band to the final desired moisture content.

9. The process claimed in claim 1 in which the discrete particles are dried in a stream of warm air until their moisture content has been reduced to about 30% and the discrete particles thereafter are dried under vacuum to the final desired moisture content.

10. The process claimed in claim 1 in which the discrete particles are dried under conditions which substantially preserve the particle size of the discrete particles.

11. The process claimed in claim 1, in which the dry powdered substance is of a cellular material and at least the major portion of the cells thereof are intact.

References Cited in the file of this patent

UNITED STATES PATENTS

| | | |
|---|---|---|
| 2,082,555 | Smith | June 1, 1937 |
| 2,185,129 | Maus | Dec. 26, 1939 |
| 2,415,445 | Schaffner | Feb. 11, 1947 |
| 2,520,891 | Rivoche | Aug. 29, 1950 |
| 2,561,442 | Lyon et al. | July 24, 1951 |
| 2,723,202 | Rivoche | Nov. 8, 1955 |